US011397891B2

(12) United States Patent
Liu et al.

(10) Patent No.: US 11,397,891 B2
(45) Date of Patent: Jul. 26, 2022

(54) INTERPRETABILITY-AWARE ADVERSARIAL ATTACK AND DEFENSE METHOD FOR DEEP LEARNINGS

(71) Applicant: International Business Machines Corporation, Armonk, NY (US)

(72) Inventors: Sijia Liu, Somerville, MA (US); Gaoyuan Zhang, Medford, MA (US); Pin-Yu Chen, White Plains, NY (US); Chuang Gan, Cambridge, MA (US); Akhilan Boopathy, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 16/742,346

(22) Filed: Jan. 14, 2020

(65) Prior Publication Data
US 2021/0216859 A1 Jul. 15, 2021

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC ........... G06N 3/08; G06N 3/0454; G06N 5/02
See application file for complete search history.

(56) References Cited

U.S. PATENT DOCUMENTS

| 2019/0188562 | A1 | 6/2019 | Edwards et al. |
| 2019/0238568 | A1 | 8/2019 | Goswami et al. |
| 2020/0110982 | A1* | 4/2020 | Gou ................ G06N 3/088 |

OTHER PUBLICATIONS

Athalye, A. et al., "Synthesizing Robust Adversarial Examples", arXiv preprint arXiv: 1707.07397, Jun. 7, 2018.
Athalye, A. et al., "Obfuscated Gradients Give a False Sense of Security: Circumventing Defenses to Adversarial Examples", Proceedings of the 35th International Conference on Machine Learning, arXiv preprint arXiv: 1802.00420, Jul. 31, 2018.
Bau, D. et al., "Network Dissection: Quantifying Interpretability of Deep Visual Representations", In Proceedings of the IEEE Conference on Computer Vision and Pattern Recognition, pp. 6541-6549, Apr. 2017.

(Continued)

*Primary Examiner* — Nghia M Doan
(74) *Attorney, Agent, or Firm* — Lieberman & Brandsdorfer, LLC

(57) ABSTRACT

Embodiments relate to a system, program product, and method to support a convolutional neural network (CNN). A class-specific discriminative image region is localized to interpret a prediction of a CNN and to apply a class activation map (CAM) function to received input data. First and second attacks are generated on the CNN with respect to the received input data. The first attack generates first perturbed data and a corresponding first CAM, and the second attack generates second perturbed data and a corresponding second CAM. An interpretability discrepancy is measured to quantify one or more differences between the first CAM and the second CAM. The measured interpretability discrepancy is applied to the CNN. The application is a response to an inconsistency between the first CAM and the second CAM and functions to strengthen the CNN against an adversarial attack.

20 Claims, 6 Drawing Sheets

(56) References Cited

OTHER PUBLICATIONS

Brown, T. et al., "Adversarial Patch", arXiv preprint arXiv: 1712.09665, May 17, 2018.
Carlini, Nicholas, "Is AmI (Attacks Meet Interpretability) Robust to Adversarial Examples?", arXiv preprint arXiv: 1902.02322, Feb. 6, 2019.
Carlini, N. et al., "Towards Evaluating the Robustness of Neutral Networks", arXiv:1608.04644v2, Mar. 22, 2017.
Chattopadhay, A. et al., "Grad-CAM++: Improved Visual Explanations for Deep Convolutional Networks", larXiv: 1710.11063v3, Nov. 9, 2018.
Chen, J. et al., "Robust Attribution Regularization", arXiv: 1905.09957v3, Oct. 26, 2019.
Chen, P. et al., "EAD: Elastic-Net Attacks to Deep Neural Networks via Adversarial Examples", arXiv:1709.04114v3, Feb. 10, 2018.
Dombrowski, A. et al., "Explanations can be manipulated and geometry is to blame", arXiv: 1906.07983v2, Sep. 25, 2019.
Engstrom, L. et al., "Adversarial Robustness as a Prior for Learning Representation", arXiv: 1906.00945v2, Sep. 27, 2019.
Eykholt, K. et al., "Robust Physical-World Attacks on Deep Learning Visual Classification", In Proceedings of the IEEE Conference on Computer Vision and Pattern Recognition, pp. 1625-1634, 2018.
Ghorbani, A. et al., "Interpretation of Neural Networks is Fragile", aarXiv: 1710.10547, Nov. 6, 2018.
Ghorbani, A. et al., "Interpretation of Neural Networks is Fragile", The Thirty-Third AAAI Conference on Artificial Intelligence, vol. 33, pp. 3681-3688, 2019.
Kang, D. et al., "Testing Robustness Against Unforeseen Adversaries", arXiv: 1908.08016, Aug. 21, 2019.
Moosavi-Dezfooli, S. et al., "Robustness via curvature regularization, and vice versa", Proceedings of the IEEE Conference on Computer Vision and Pattern Recognition, pp. 9078-9086, 2019.
Papernot, N. et al., "The Limitations of Deep Learning in Adversarial Settings", IEEE European Symposium on Security and Privacy (EuroS&P), pp. 372-387. IEEE, Nov. 24, 2015.
Papernot, N. et al., "Distillation as a Defense to Adversarial Perturbations against Deep Neural Networks", 37th IEEE Symposium on Security & Privacy, pp. 582-597 IEEE, Mar. 14, 2016.
Petsiuk, V. et al., "Rise: Randomized Input Sampling for Explanation of Black-box Models", arXiv: 1806.07421, 2018.
Ros, A. et al., "Improving the Adversarial Robustness and Interpretability of Deep Neural Networks by Regularizing Their Input Gradients", In Thirty-second AAAI Conference on Artificial Intelligence, 2018.
Selvaraju, R. et al., "Grad-CAM: Visual Explanations from Deep Networks via Gradient-based Localization", Proceedings of the IEEE International Conference on Computer Vision, pp. 618-626, 2017.
Simonyan, K. et al., "Deep Inside Convolutional Networks: Visualising Image Classification Models and Saliency Maps", arXiv: 1312.6034, Apr. 19, 2014.
Smilkov, D., et al. "Smoothgrad: removing noise by adding noise", arXiv: 1706.03825, Jun. 12, 2017.
Springenberg, J. T., et al., "Striving for Simplicity: The All Convolutional Net", ICLR 2015, arXiv: 1412.6806, Apr. 13, 2015.
Su, D., et al., Is Robustness the Cost of Accuracy? A Comprehensive Study on Robustness of 18 Deep Image Classification Models, arXiv: 1808.01688v2, Mar. 4, 2019.
Subramanya, A., et al., "Fooling Network Interpretation in Image Classification", arXiv:1812.02843v2, Sep. 24, 2019.
Sundararajan, M., et al., "Axiomatic Attribution for Deep Networks" arXiv: 1703.01365v2, Jun. 13, 2017.
Szegedy, C., et al., "Intriguing properties of neural networks" arXiv: 1312.6199v4, Feb. 19, 2014.
Xu, K., et al., Interpreting Adversarial Examples by Activation Promotion and Suppression, arXiv: 1904.02057v2, Sep. 30, 2019.
Xu, K., et al., "Structured Adversarial Attack: Towards General Implementation and Better Interpretability", arXiv: 1808.01664v3, Feb. 19, 2019.
Yeh, C., et al., "On the (In)fedility and Sensitivity of Explanations", 33rd Conference on Neural Information Processing Systems (NeurIPS 2019), arXiv: 1901.09392v4, Nov. 3, 2019.
Zeiler, M., et al., "Visualizing and Understanding Convolutional Networks", arXiv: 1311.2901v3, Nov. 28, 2013.
Zhang, H., et al., "Theoretically Principled Trade-off between Robustness and Accuracy", arXiv: 1901.08573v3, Jun. 24, 2019.
Zhang, X., et al., "Interpretable Deep Learning under Fire", arXiv: 1812.00891v3, Sep. 18, 2019.
Zhou, B., et al., "Learning Deep Features for Discriminative Localization", Proceeding of the IEEE Conference on Computer Vision and Pattern Recognition, pp. 2921-2929, 2016.
Prakash, A., et al., "Deflecting Adversarial Attacks with Pixel Deflection", 2018 IEEE/CVF Conference on Computer Vision and Pattern Recognition (CVPR), pp. 8571-8580, Jun. 2018.
Das, N., et al., "Keeping the Bad Guys Out: Protecting and Vaccinating Deep Learning with JPEG Compression", arXiv: 1705.02900v1, May 8, 2017.
Luo, Y., et al., "Foveation-Based Mechanisms Alleviate Adversarial Examples", arXiv: 1511.06292v3, Jan. 19, 2016.
Madry, A., et al., "Towards Deep Learning Models Resistant to Adversarial Attacks", arXiv 1706.06083v4, Sep. 4, 2019.
Meng, D., "MagNet: a Two-Pronged Defense against Adversarial Examples", CCS '17, Session A3: Adversarial Machine Learning, pp. 135-147, Oct. 30-Nov. 3, 2017.
Goodfellow, I., et al., "Explaining and Harnessing Adversarial Examples", arXiv 1412.6572v3, Mar. 20, 2015.
Lu, J., et al., "SafetyNet: Detecting and Rejecting Adversarial Examples Robustly", pp. 446-454, arXiv 1704.00103v2, Aug. 15, 2017.

* cited by examiner

INTERPRETABILITY-AWARE ADVERSARIAL ATTACK AND DEFENSE METHOD FOR DEEP LEARNINGS

BACKGROUND

The present embodiments relate to an artificial intelligence platform and a convolutional neural network, and more specifically, the embodiments are directed to a defensive optimization methodology to defend against adversarial attacks on the neural network with respect to misclassification and misinterpretation.

SUMMARY

The embodiments include a system, computer program product, and method for cross-compliance risk assessment and optimization.

In one aspect, a computer system is provided to support an artificial intelligence (AI) platform. As shown, a processor is operatively coupled to the memory and is in communication with the AI platform. The AI platform is provided with tools to support a convolutional neural network (CNN). The tools include a map manager, an attack manager, a measurement manager, and an application manager. The map manager functions to localize a class-specific discriminative image region to interpret a prediction of a CNN, which includes application of a class activation map (CAM) function to received input data. The attack manager functions to generate both a first and a second attack on the CNN with respect to the received input data. The first attack generates first perturbed data and a first CAM, and the second attack generates second perturbed data and a second CAM. The measurement manager functions to evaluate the CNN attacks by measuring an interpretability discrepancy to quantify one or more differences between the first CAM and the second CAM. The application manager functions to apply the measured interpretability discrepancy to the CNN. The application of the measured interpretability discrepancy is a response to any inconsistency between the first CAM and the second CAM as determined in the evaluation. A modified CNN is generated as output from the AI platform, with the modified CNN including one or more reinforcement protocols against an adversarial attack.

In another aspect, a computer program product is provided to support a convolutional neural network (CNN). The computer program product includes a computer readable storage medium with embodied program code that is executable by a processing unit. Program code is provided to localize a class-specific discriminative image region to interpret a prediction of a CNN, which includes application of a class activation map (CAM) function to received input data. The program code generates both a first and a second attack on the CNN with respect to the received input data. The first attack generates first perturbed data and a first CAM, and the second attack generates second perturbed data and a second CAM. Program code is further provided to measure an interpretability discrepancy, with the measurement quantifying one or more differences between the first CAM and the second CAM. Program code applies the measured interpretability discrepancy to the CNN. The application of the measured interpretability discrepancy is a response to any inconsistency between the first CAM and the second CAM. A modified CNN is generated as output from an AI platform, with the modified CNN including one or more reinforcement protocols against an adversarial attack.

In yet another aspect, a method is provided to support a convolutional neural network (CNN). A class-specific discriminative image region is localized to interpret a prediction of a CNN, which includes application of a class activation map (CAM) function to received input data. Two attacks are generated and application to the CNN, including a first and a second attack, with both the first and second attacks being generated with respect to the received input data. The first attack generates first perturbed data and a first CAM, and the second attack generates second perturbed data and a second CAM. An interpretability discrepancy is measured to quantify one or more differences between the first CAM and the second CAM. The measured interpretability discrepancy is applied to the CNN. The application of the discrepancy is a response to an inconsistency between the first CAM and the second CAM, and further functions to strengthen the CNN against an adversarial attack.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
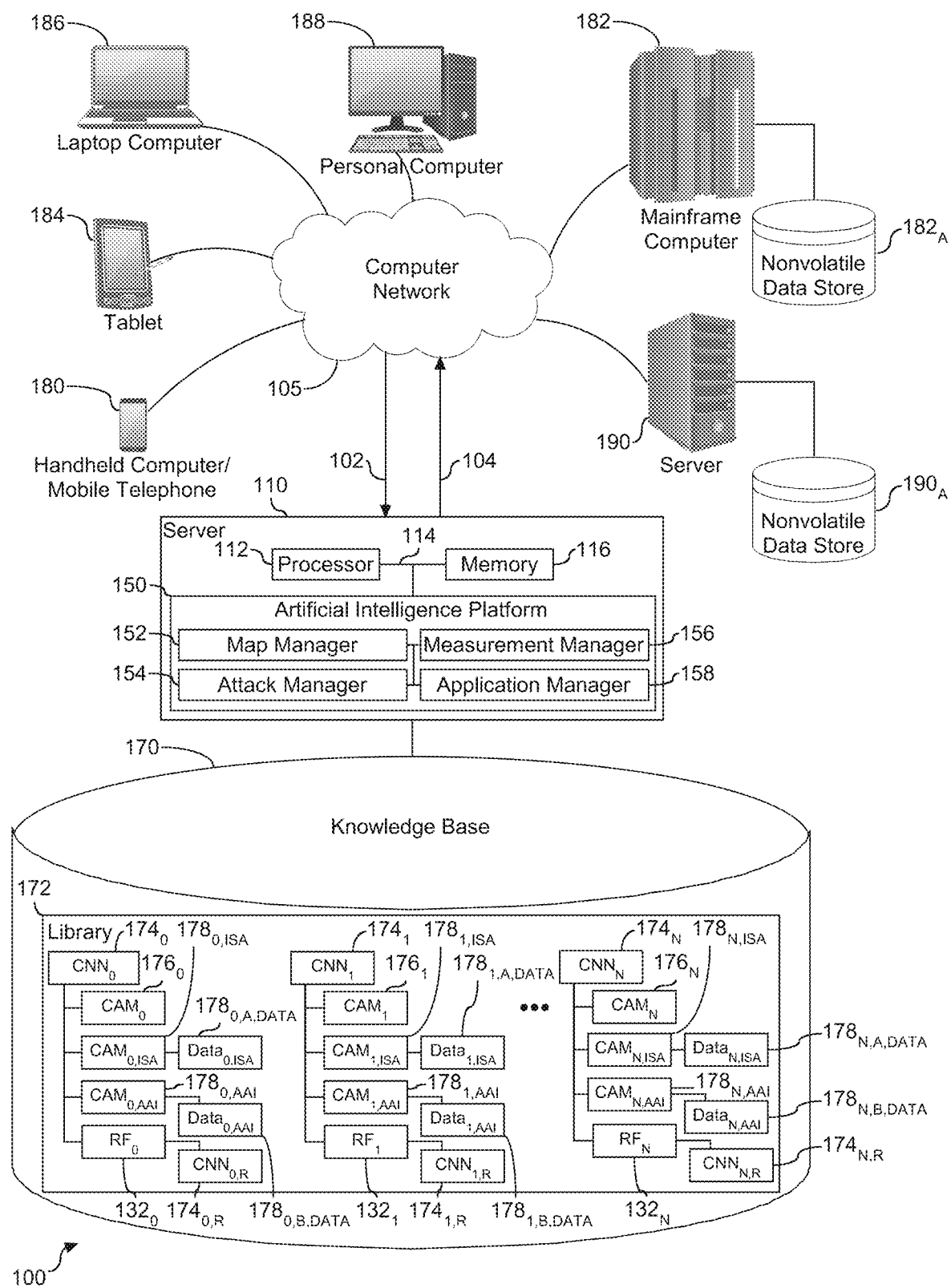
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. For example, to process natural language, the system may be trained with data derived from a database or corpus of knowledge, but the resulting outcome can be incorrect or inaccurate for a variety of reasons.

Machine learning (ML), which is a subset of AI, utilizes algorithms to learn from data and create foresights based on this data. More specifically, ML is the application of AI through creation of models, for example, neural networks that can demonstrate learning behavior by performing tasks that are not explicitly programmed. Deep learning is a type of ML in which systems can accomplish complex tasks by using multiple layers of neurons that activate based on an output or outputs of a previous layer of neurons, creating increasingly smarter and more abstract activations.

At the core of AI and associated reasoning lies the concept of similarity. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content in response to the identification and understanding as well as changes to the structures are extremely difficult at a practical level.

Deep learning is a method of machine learning that incorporates neurons in successive layers to learn from data in an iterative manner. Neural networks are models of the way the nervous system operates. Basic units are referred to as neurons, which are typically organized into layers. The neural network works by simulating a large number of interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to some neurons in the next layer. At a basic level, each layer of the neural network includes one or more operators or functions operatively coupled to output and input. The outputs of evaluating the activation functions of each neuron with provided inputs are referred to herein as activations. Deep learning complex neural networks are designed to emulate how the human brain works, so computers can be trained to support poorly defined abstractions and problems where training data is available. Neural networks and deep learning are often used in image recognition, speech, and computer vision applications.

A convolutional neural network (CNN) is a type of artificial neural network used in the field of image recognition and processing, and in one embodiment is designed to process pixel data. Once a CNN is built, it can be used to classify content of different images. Hidden layers of the CNN function to extract features from image input data. CNNs classify images by detecting features to identify objects. Correctness of the CNN output is coupled to the strength of a map indicating locations and strength of a detected feature in the input data, e.g. input image. It is understood in the art that CNNs are vulnerable to adversarial attacks, which in one embodiment may be reflected in the map, namely perturbed inputs with intention to mislead network prediction.

Two types of network interpretation methods are utilized to explain what and why CNNs predict. The methods are referred to as a class activation map (CAM) type and a pixel sensitivity map (PSM) type. The CAM type localizes a class-discriminative image region that explains which parts of an image are looked at by the CNN for assigning a class label. The PSM evaluates the importance of individual pixels of the input through sensitivity of the classification decision to a change of these pixels. The PSM uses calculations with gradients to assign importance scores to individual pixels toward explaining the classification decision about an input.

Interpretability discrepancy can be caused by adversarial perturbation. An adversarial example, x', is an image, x, with an adversarial perturbation, $\delta$, such that $x'=x+\delta$. By replacing the input image, x, with an adversarial example image, x', the CNN will be fooled from the correct label, also known as the true label, t, to the target label, also known as an incorrect label, t'. Interpretation methods and corresponding functions highlight relevant image regions in the input for classification. Perturbations within an image or image region can either change classification, e.g. misclassification, while maintaining interpretation, known as interpretability sneaking attack (ISA), or change the interpretation, e.g. misinterpretation, while maintaining classification, known as attack again interpretability (AAI). It is understood in the art that an adversarial example is designed for misclassification, and gives rise to interpretability discrepancy, which could then be used as a detector for adversarial input. With respect to ISA, mistakes may appear in classification of one or more images while maintaining interpretation. Different from ISA, AAI produces input perturbations to maximize the interpretability discrepancy while keeping the classification decision input. More specifically, with respect to AAI, perturbed inputs could induce differing explanations without altering predictions.

As shown and described herein, an interpretability based defense system, method, and computer program product is provided to penalize interpretability discrepancy to achieve high classification robustness. Let $f(x) \in \mathbb{R}^C$ denote a CNN-based predictor that maps an input $x \in \mathbb{R}^d$ to a probability vector of C classes. The cth element of f(x) is shown as $f_c(x)$, which denotes the classification score for class c. An interpretation of the input image and the vector class, L(x,c), reflects where in x contributes to the classifier's decision on c. Interpretability discrepancy can be introduced with respect to both the true and target labels in terms of L(x,t) versus L(x',t) and L(x,t') versus L(x',t'). The following formula is utilized to measure discrepancy:

$$D(x,x') = \frac{1}{2}(\|L(x,t)-L(x',t)\|_1 + \|L(x,t')-L(x',t')\|_1) \quad \text{Formula 1}$$

where x and x' are natural and adversarial examples, respectively, and L represents an interpreter. However, the discrepancy measurement cannot directly be used by a defender of adversarial input since the target label t' specified by the adversary is not known a priori. To circumvent this issue, the discrepancy measure is approximated with respect to the target label by weighting discrepancies from all non-true classes according to their importance in prediction. The following is a modification of the discrepancy measure, also referred to herein as a regularization function:

$$\tilde{D}(x, x') = \frac{1}{2}\left(\|L(x, t) - L(x', t)\|_1 + \frac{1}{2}\sum_{i \neq t} \frac{e^{f(x')i}}{\sum_i e^{f(x')i}} \|L(x, i) - L(x', i)\|_1\right) \quad \text{Formula 2}$$

where the softmax function:

$$\frac{e^{f(x')i}}{\sum_i e^{f(x')i}} \quad \text{Formula 3}$$

adjusts the importance of non-true labels according to their classification confidence.

The regularization function, as shown in Formula 2, represents susceptibility of the CNN to an attack. In one embodiment, the regularization function represents weakness of the CNN when facing either or both an ISA and an AAI attack. As shown and described herein, the regularization function is applied to re-train the CNN to mitigate the susceptibility of the network to different forms of attacks. The CNN is re-trained against a worst case interpretability discrepancy, as shown in Formula 2, yielding the following min-max optimization problem:

$$\text{minimum}_\theta E_{(x,t) \sim D_{train}} [f_{train}(\theta,x,t) + \gamma_{x':\|x'-x\|_\infty \leq \epsilon} \tilde{D}(x,x')]t \quad \text{Formula 4}$$

where θ denotes the model parameters, $D_{train}$ denotes the training dataset, $f_{train}$ is the training loss, e.g. cross-entropy loss, y is a regularization parameter, e.g. γ>0, to control the tradeoff between clean accuracy and susceptibility.

An interpretability-aware robust system and training method is shown and described. Referring to FIG. 1, a schematic diagram of a computing system (100) to support a convolutional neural network (CNN) is depicted. As shown, a server (110) is provided in communication with a plurality of computing devices (180), (182), (184), (186), (188), and (190) across a network (105). The server (110) is configured with a processing unit (112) in communication with memory (116) across a bus (114). The server (110) is shown with an artificial intelligence (AI) platform (150) for CNN management and support, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the computer network (105) enable CNN attack management, including application of reinforcement protocols to the CNN to prevent or mitigate an adversarial attack. The server (110) is in operative communication with the computer network (105) through communications links (102) and (104). Links (102) and (104) may be wired or wireless. In one embodiment, link (102) is synonymous with input data communicated to the server (110), and link (104) is synonymous with output data communicated to one of the computing devices (180)-(190) across the network (105). Other embodiments of the server (110) may be used with components, systems, sub-systems, and/or devices other than those that are depicted herein.

The AI platform (150) is shown herein configured to receive input (102) from various sources. For example, AI platform (150) may receive input from the network (105) and leverage a data source (170), also referred to herein as a corpus or knowledge base, to create output or response content. The AI platform (150) is provided with tools to support and enable a defensive optimization methodology to defend against adversarial attacks on the neural network with respect to misclassification and misinterpretation.

The AI platform (150) functions to generate a modified CNN as output, with the modified CNN including one or more reinforcement protocols against an adversarial attack. In one embodiment, the AI platform (150) communicates response output to members operatively coupled to the server (110), such as one or more of the computing devices (180)-(190) across the network (105).

The AI platform (150) is shown herein configured with tools to enable CNN attack management and associated CNN reinforcement. The tools function to implement a CNN defense scheme for development of remedial measures in the form of designing a corresponding regularization function, and training or re-training the CNN with the regularization function to mitigate an adversarial attack on the CNN. The tools include, but are not limited to, a map manager (152), an attack manager (154), a measurement manager (156), and an application manager (158). The AI platform (150) may receive input from the network (105) and leverage a data source (170), also referred to herein as a corpus or knowledge base, to selectively access the CNN and associated maps. As shown the data source (170) is configured with a library (172) with one or more CNNs that are subject to support and management by the tools (152)-(158). Although only one library is show, in one embodiment, the data source (170) may be configured with multiple libraries. The library (172) is shown with a plurality of CNNs, including $CNN_0$ ($174_0$), $CNN_1$ ($174_1$), ..., $CNN_N$ ($174_N$). The quantity of CNNs shown is for illustrative purposes and should not be considered limiting. Each CNN has a corresponding class activation map (CAM). As shown, $CNN_0$ ($174_0$) is operatively coupled to $CAM_0$ ($176_0$), $CNN_1$ ($174_1$) is operatively coupled to $CAM_1$ ($176_1$), ..., $CNN_N$ ($174_N$) is operatively coupled to $CAM_N$ ($176_N$).

It is understood in the art that an imperceptible adversarial perturbation may be applied to the CNN to interfere with or confuse a classifier, which can lead to a significant change in a class-specific network interpretation map, e.g. CAM. Perturbed data refers to original data together with adversarial perturbation generated from an attack method. The tools (152)-(158) shown and described herein are directed at generating attacks on the CNN with a corresponding attack method. As shown and described herein, two types of attacks are generated, including misclassification, e.g. ISA, and misinterpretation, e.g. AAI, which in turn generates perturbed data and a modified CAM, e.g. modified from the original CAM, measuring the modified CAM, and applying the measurement(s) to the CNN to mitigate against an adversarial perturbation to the CNN. The CAM is a mapping function which maps input to an interpretation heat map. The map manager (152) functions to apply a CAM associated with a CNN to input data received across the network (105). The map manager (152) localizes a class-specific discriminative image region to interpret a prediction of the CNN. The attack manager (154), shown herein operatively coupled to the map manager (152), generates attacks on the CNN with respect to the received input data (102). The attack perturbs the data. The attacks applied to the CNN by the attack manager (154) include an ISA attack and an AAI attack. In one embodiment, alternative or additional classes of attacks may be employed by the attack manager (154). The ISA attack, also referred to herein as a first attack, generates perturbed data, referred to herein as first perturbed data associated with the ISA attack, and a corresponding modified CAM, e.g. first CAM, each stored in the knowledge base (170) and operatively coupled to the CNN. Since the data generated by the attack is perturbed, the CAM of the perturbed data will be different from the CAM of the original data. As shown herein, $CNN_0$ ($174_0$) is shown with the first CAM, $CAM_{0,ISA}$ ($178_{0,ISA}$) and the first perturbed data, $data_{0,ISA}$ ($178_{0,A,DATA}$). The AAI attack, also referred to herein as a second attack, generates perturbed data, referred to herein as second perturbed data associated with the AAI attack, and a corresponding modified CAM, e.g. second CAM, each stored in the knowledge base (170) and operatively coupled to the CNN. As shown herein, $CNN_0$ ($174_0$) is shown with the second CAM, $CAM_{0,AAI}$ ($178_{0,AAI}$), and the second perturbed data, $data_{0,AAI}$ ($178_{0,B,DATA}$). Accordingly, the attack manager generates at least two separate attacks on the CNN from which output is generated in the form of corresponding perturbed data and a modified CAM.

The measurement manager (156) is shown herein operatively coupled to the map manager (152) and the attack manager (154). The measurement manager (156) functions to assess output from the ISA and AAI attacks on the CNN. More specifically, the measurement manager (156) measures an interpretability discrepancy between the ISA and AAI by quantifying differences between the classes of attacks as reflected in their generated maps, and in one embodiment differences between the original data and the perturbed data. In one embodiment, the generated maps function as a unified metric to quantify performance of the network against the ISA and AAI attacks. With respect to the ISA and AAI attacks, the quantified performance reflects robustness of the CNN in classification and robustness in network interpretability. The measurement manager (156) leverages the interpretability discrepancy to design a regularization function to minimize inconsistency between the generated CAMs, as well as minimize interpretability discrepancy. In one embodiment, and as shown herein, the measurement manager (156) applies a softmax function to the regularization function to adjust importance of one or more non-true labels according to their classification confidence. As shown herein, $CNN_0$ ($174_0$) is shown with regularization function, $RF_0$ ($132_0$).

After the regularization function is designed or otherwise created, the application manager (156) applies the regularization function to the CNN, and more specifically subjects the CNN to re-training with the regularization function. Based on the example provided, the measurement manager (156) applies regularization function, $RF_0$ ($132_0$) to $CNN_0$ ($174_0$) to create and re-train CNN, shown herein as $CNN_{0,R}$ ($174_{0,R}$). The re-trained CNN effectively creates a new or modified CNN as output from the AI platform (150), with the new or modified CNN having been modified with one or more re-enforcement protocols against an adversarial attack. Accordingly, in cooperation with the measurement manager (156), the application manager (158) subjects the corresponding or subject CNN to re-training with the developed regularization function to enhance accuracy of the model against adverse attacks.

It is understood in the art that in addition to ISA and AAI attacks, there are other forms of attacks. In one embodiment, and as shown herein, the measurement manager (156) subjects the re-trained CNN, e.g. $CNN_{0,R}$ ($174_{0,R}$), to further evaluation against one or more baseline models to further mitigate adversarial attacks. Examples of these adversarial models include, but are not limited to, TRADES, IG-Norm, etc. Accordingly, the cluster manager (156) manages and manipulates the data associated with the clusters to determine whether the data contained therein is poisonous or legitimate, and actively and dynamically manages the clusters thereafter.

In one embodiment, the regularization function is communicated or otherwise transmitted to the processing unit (112) for execution of re-training of the CNN. In one embodiment, the regularization function is communicated to a corresponding network device operatively coupled to the server (110) or in one embodiment, operatively coupled to one or more of the computing devices (180)-(190) across the network connections (102) and (104).

The network (105) may include local network connections and remote connections in various embodiments, such that the artificial intelligence platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

In some illustrative embodiments, server (110) may be the IBM Watson® system available from International Business Machines Corporation of Armonk, N.Y., may be augmented with the mechanisms of the illustrative embodiments described hereafter. The tools enable shown herein as the map manager (152), attack manager (154), measurement manager (156), and application manager (158), hereinafter referred to collectively as AI tools or AI platform tools, are shown as being embodied in or integrated within the AI platform (150) of the server (110). The AI tools may be implemented in a separate computing system (e.g., 190) that is connected across network (105) to the server (110). Wherever embodied, the AI tools function to support to a defensive optimization methodology to defend against adversarial attacks on the neural network with respect to misclassification and misinterpretation.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105).

Types of computer networks (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes non-volatile data store ($190_A$), and mainframe computer (182) utilizes nonvolatile data store ($182_A$). The non-volatile data store ($182_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
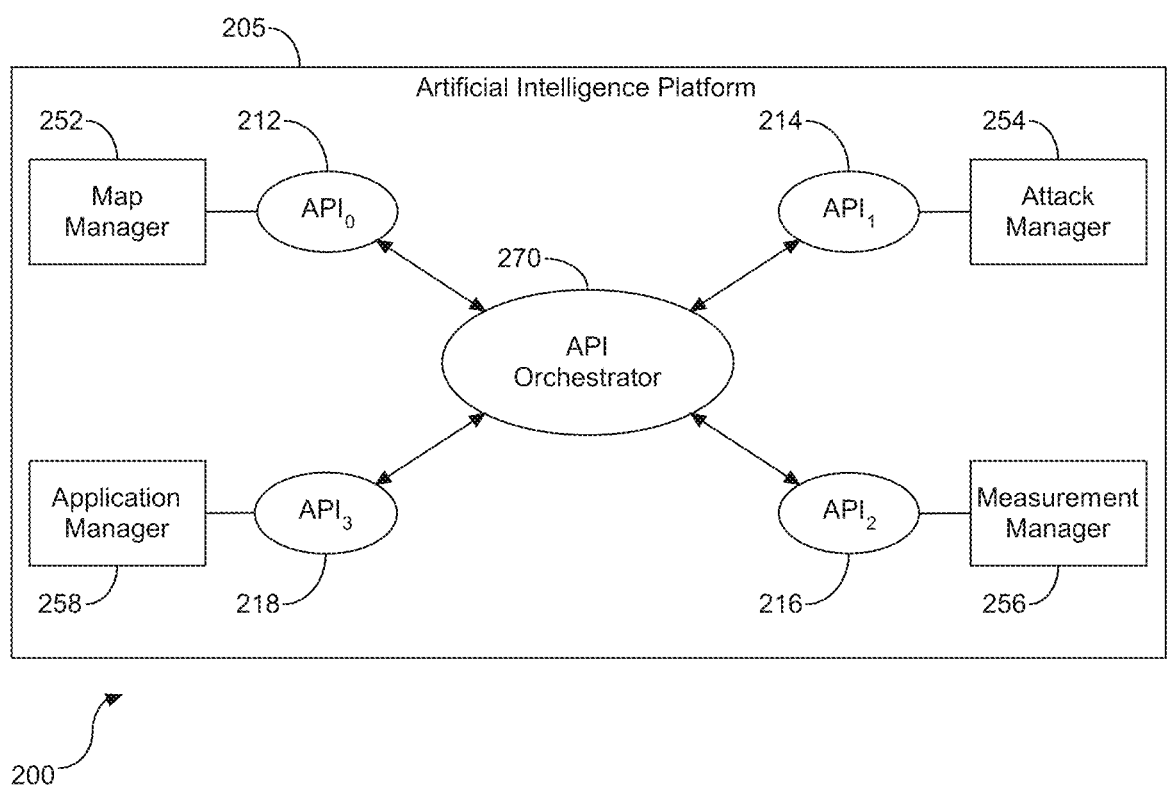
FIG. 2 depicts a block diagram illustrating artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(158) and their associated functionality. Referring to FIG. 2, a block diagram (200) is provided illustrating the tools (252)-(258) and their associated APIs. As shown, a plurality of tools is embedded within the AI platform (205), with the tools including the map manager (152) shown herein as (252) associated with $API_0$ (212), the attack manager (154) shown herein as (254) associated with $API_1$ (214), the measurement manager (156) shown herein as (256) associated with $API_2$ (216), and the application manager (158) shown herein as (258) associated with $API_3$ (218). Each of the APIs may be implemented in one or more languages and interface specifications. $API_0$ (212) provides functional support to localize a class-specific discriminative image region to interpret a CNN prediction and to apply a CAM to received input data; $API_1$ (214) provides functional support generating attacks, e.g. controlled attacks, on the CNN; $API_2$ (216) provides functional support to conduct an assessment of the CNN attacks, including measuring an interpretability discrepancy between the CAMs generated from the attacks; and $API_3$ (218) provides functional support to apply the measured interpretability discrepancy to the CNN, and more specifically to subject the CNN to re-training.

As shown, each of the APIs (212), (214), (216), and (218) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
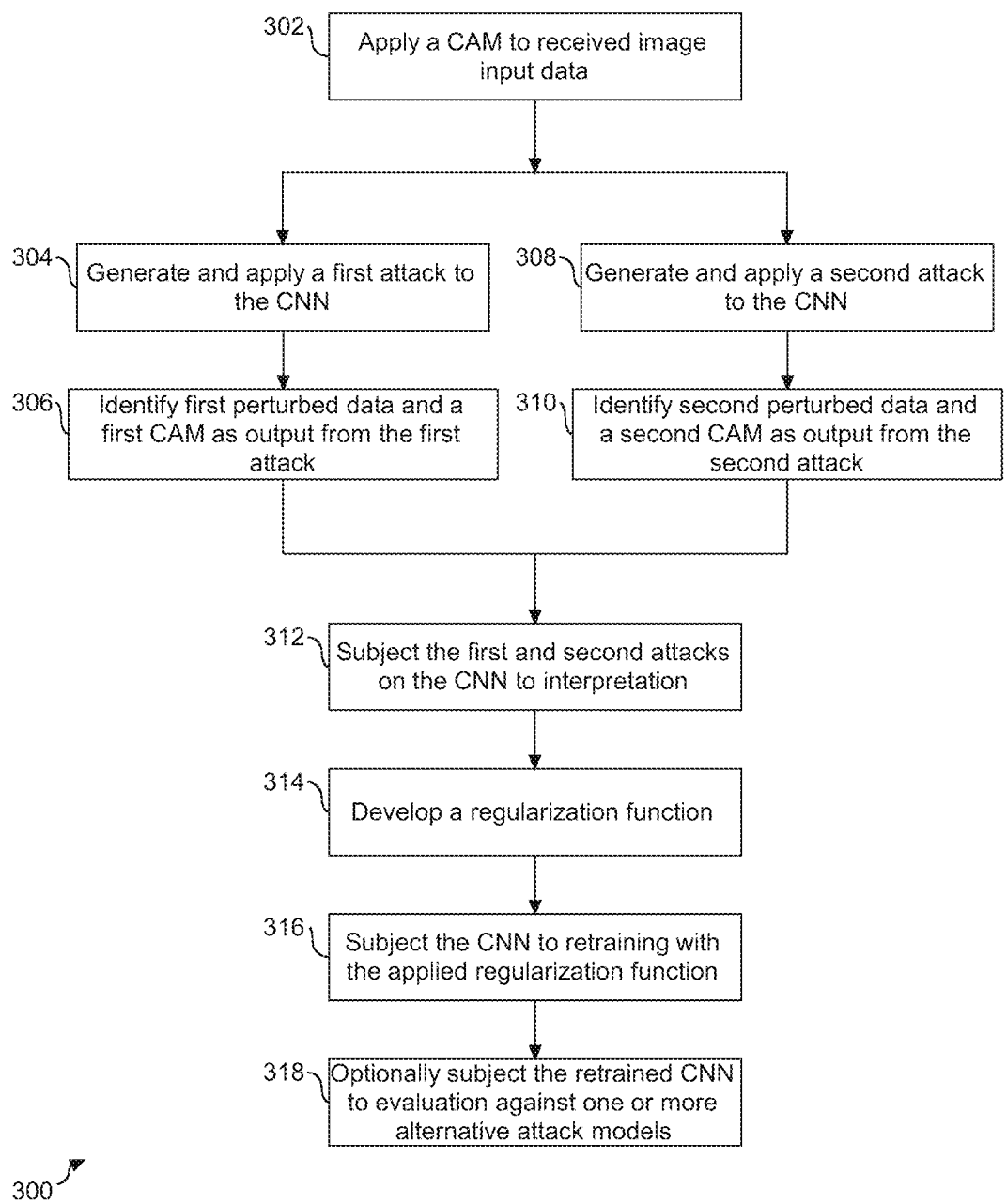
FIG. 3 depicts a flow chart illustrating an embodiment of a method for developing a regularization function, and applying the regularization function to the CNN for re-training of the network.

Referring to FIG. 3, a flow chart (300) is provided to illustrate a process for developing a regularization function, and applying the regularization function to the CNN for re-training of the network. As shown, a class activation map (CAM) is applied to received image input data, and functions to localize a class-specific discriminative image region to interpret prediction by the CNN (302). In one embodiment, the CAM applied at step (302) is an original CAM, or a CAM corresponding to unperturbed data. Although PSM is able to highlight fine-grained details in the image, it is computationally intensive compared to CAM, and as such the embodiment described in detail are directed at the CAM. As shown, the CNN is initially examined with respect to two types of threat models, including interpretability sneaking attack (ISA) and attack again interpretability (AAI). In one embodiment, the CNN may be subject to additional or alternative threat models, and as such should not be limited to ISA and AAI attacks. The same data is utilized for the different attack forms, and is referred to herein as original or unperturbed data. Each attack generates perturbed data and a changed CAM.

As shown herein, a first attack based on ISA is generated and applied to the CNN with the original data (304), and first perturbed data and a first CAM are identified as output from the first attack (306). Similarly, a second attack is generated and applied to the CNN with the original data, with the second attack being based on AAI (308), and second perturbed data and a second CAM are identified as output from the second attack (310). In the example shown herein, application of the threat models based on ISA and AAI and their generated output are shown in parallel, although in one embodiment, they may occur sequentially. Accordingly, two different forms of attacks with the same input data, e.g. original data, are applied to the CNN.

Following steps (306) and (310), the relationship between robustness in classification (AAI) and robustness in interpretation (ISA) is evaluated. More specifically, the first and second attacks on the CNN are subject to interpretation by quantifying the differences between the first CAM generated from the first attack and the second CAM generated from the second attack (312). The differences of the CAMs with respect to the original data and the perturbed data are used to quantify the effect of the corresponding attack. In addition, the properties of the ISA attack and the properties of the AAI attack are utilized to develop a regularization function (314). The design and development of the regularization function is directed at and attains minimizing inconsistency between the first CAM and the second CAM. The regularization function design and development at step (314) includes measuring an interpretability discrepancy and quantifying one or more differences between the first CAM and second CAM of perturbed data with respect to the input data, e.g. original data. More specifically, measuring the interpretability discrepancy quantifies a relationship between robustness in classification and robustness in network interpretability. The regularization function represents susceptibility of the CNN to an attack. Designing the regularization function at step (314) includes applying a softmax function to adjust importance of one or more non-true labels according to their classification confidence.

The measured interpretability discrepancy as reflected in the regularization function is applied to the CNN (316), and more specifically, the CNN is subject to re-training with the applied regularization function so that the quantified relationship is incorporated into the network re-training, which in one embodiment includes minimizing the interpretability discrepancy. In one embodiment, the regularization function represents weakness of the CNN to an attack, and the re-training of the CNN strengths the CNN against an adversarial attack. The re-trained CNN is optionally subject to evaluation against one or more alternative attack models (318). Accordingly, ISA and AAI attacks are generated against the CNN to identify model sensitivity and to re-train the CNN to mitigate or avoid an adversarial attack on the CNN.

It is understood in the art that correctness of a decision from the CNN is coupled to the strength of the underlying map, e.g. CAM and PSM. As shown in FIG. 3, the CNN is challenged with ISA and AAI attacks to ascertain its vulnerabilities and to strengthen the map to mitigate or prevent attacks on the CNN.

Embodiments shown and described herein may be in the form of a computer system for use with an intelligent computer platform for providing orchestration of activities across one or more domains to minimize risk. Aspects of the tools (152)-(158) and their associated functionality may be embodied in a computer system/server in a single location, or in one embodiment, may be configured in a cloud based system sharing computing resources. With references to FIG. 4, a block diagram (400) is provided illustrating an example of a computer system/server (402), hereinafter referred to as a host (402) in communication with a cloud based support system (410), to implement the system, tools, and processes described above with respect to FIGS. 1-3. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

Figure 4:
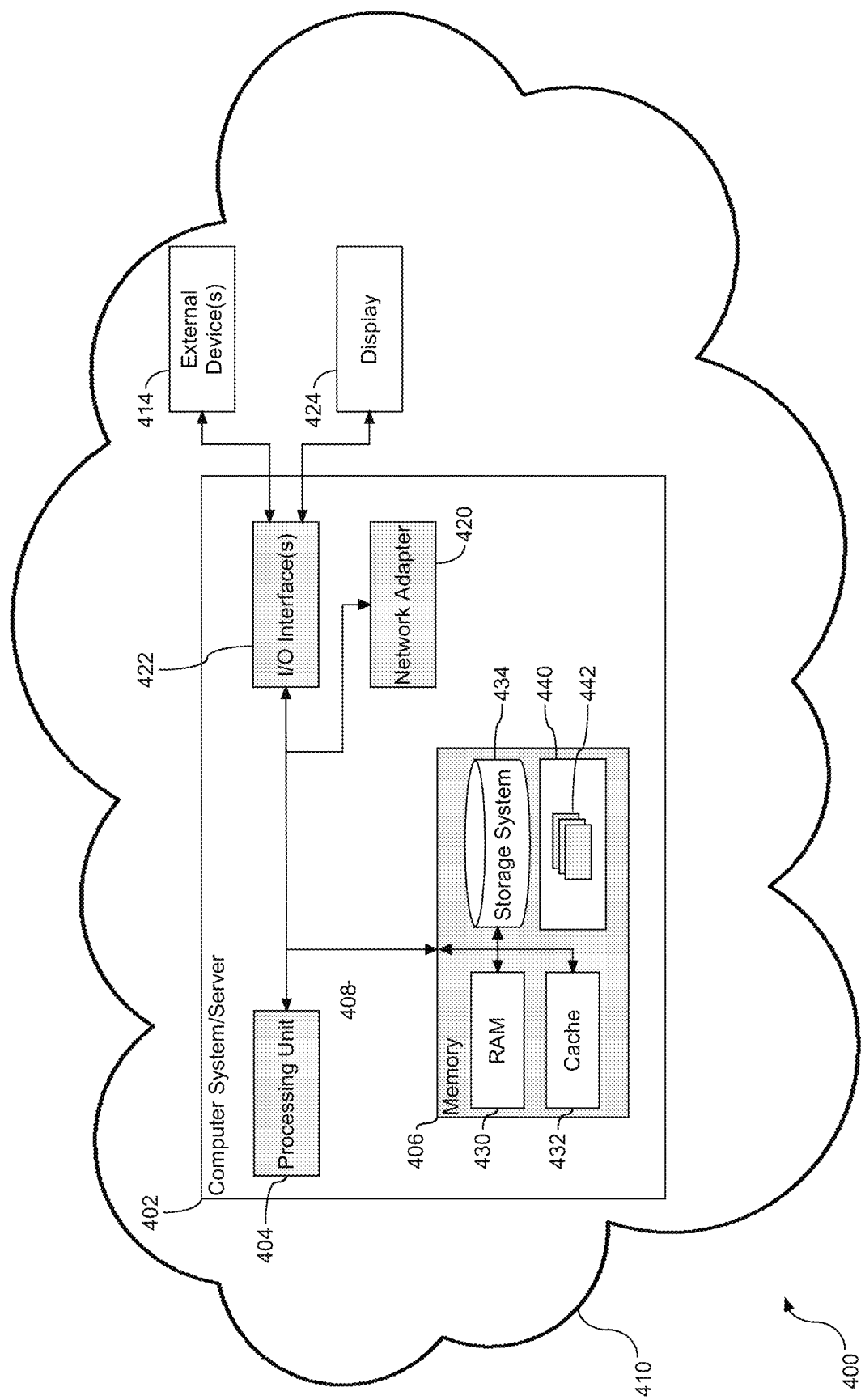
FIG. 4 depicts a block diagram illustrating an example of a computer system/server of a cloud based support system, to implement the system and processes described above with respect to FIGS. 1-3.

As shown in FIG. 4, host (402) is shown in the form of a general-purpose computing device. The components of host (402) may include, but are not limited to, one or more processors or processing units (404), e.g. hardware processors, a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (430) and/or cache memory (432). By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (440), having a set (at least one) of program modules (442), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments to dynamically process an untrusted training data set to identify potentially poisonous data and remove the identified data from a corresponding neural model. For example, the set of program modules (442) may include the tools (152)-(158) as described in FIG. 1.

Host (402) may also communicate with one or more external devices (414), such as a keyboard, a pointing device, etc.; a display (424); one or more devices that enable a user to interact with host (402); and/or any devices (e.g., network card, modem, etc.) that enable host (402) to communicate with one or more other computing devices. Such communication can occur via Input/Output (I/O) interface(s) (422). Still yet, host (402) can communicate with one or more networks such as a local area network (LAN), a general wide area network (WAN), and/or a public network (e.g., the Internet) via network adapter (420). As depicted, network adapter (420) communicates with the other components of host (402) via bus (408). In one embodiment, a plurality of nodes of a distributed file system (not shown) is in communication with the host (402) via the I/O interface (422) or via the network adapter (420). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (430), cache (432), and storage system (434), such as a removable storage drive and a hard disk installed in a hard disk drive.

Computer programs (also called computer control logic) are stored in memory (406). Computer programs may also be received via a communication interface, such as network adapter (420). Such computer programs, when run, enable the computer system to perform the features of the present embodiments as discussed herein. In particular, the computer programs, when run, enable the processing unit (404)

to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (402) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
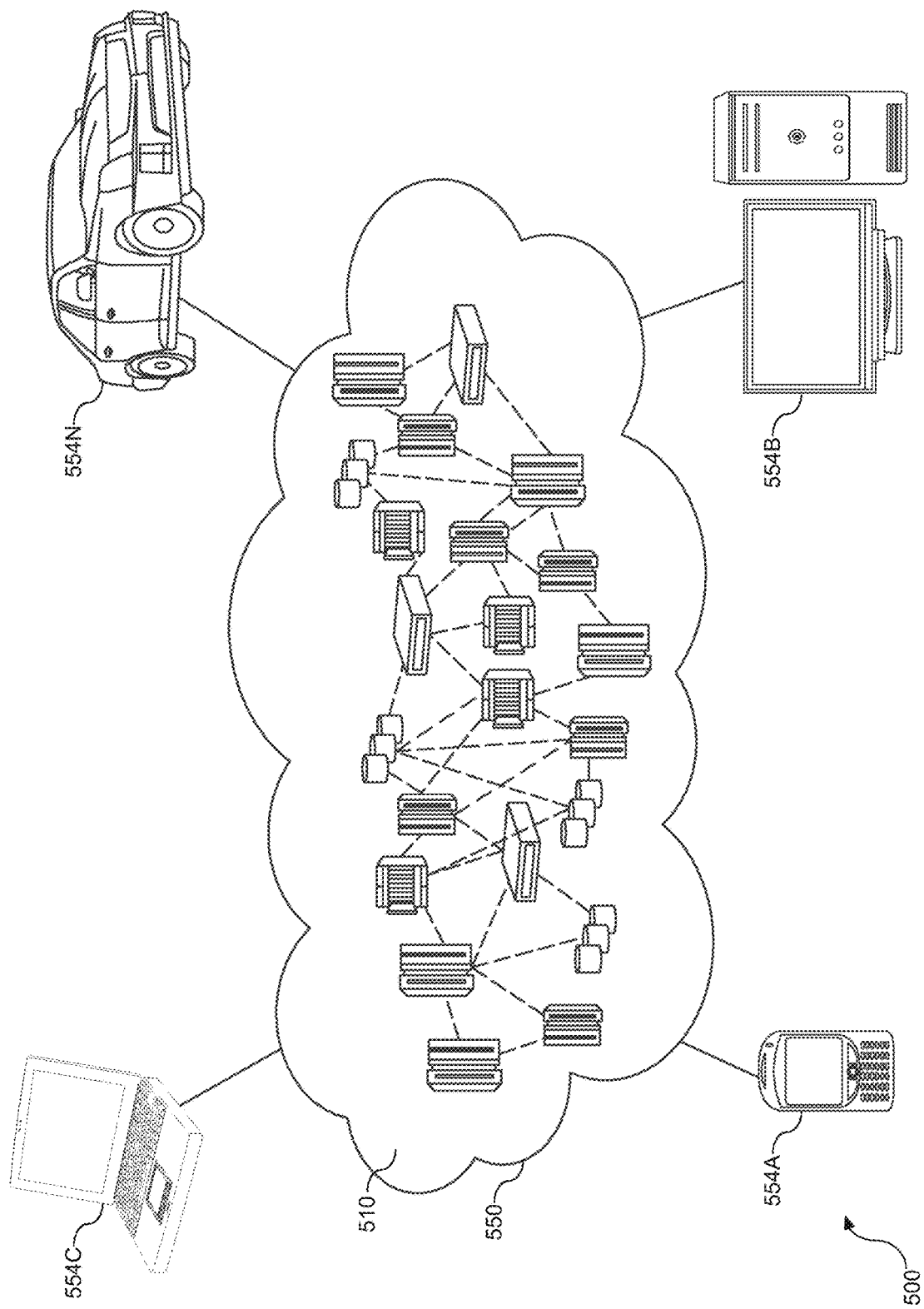
FIG. 5 depicts a block diagram illustrating a cloud computer environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A-N) shown in FIG. 5 are intended to be illustrative only and that the cloud computing environment (550) can communicate with any type of computerized device over any type of network and/or network addressable connection (e.g., using a web browser).

Figure 6:
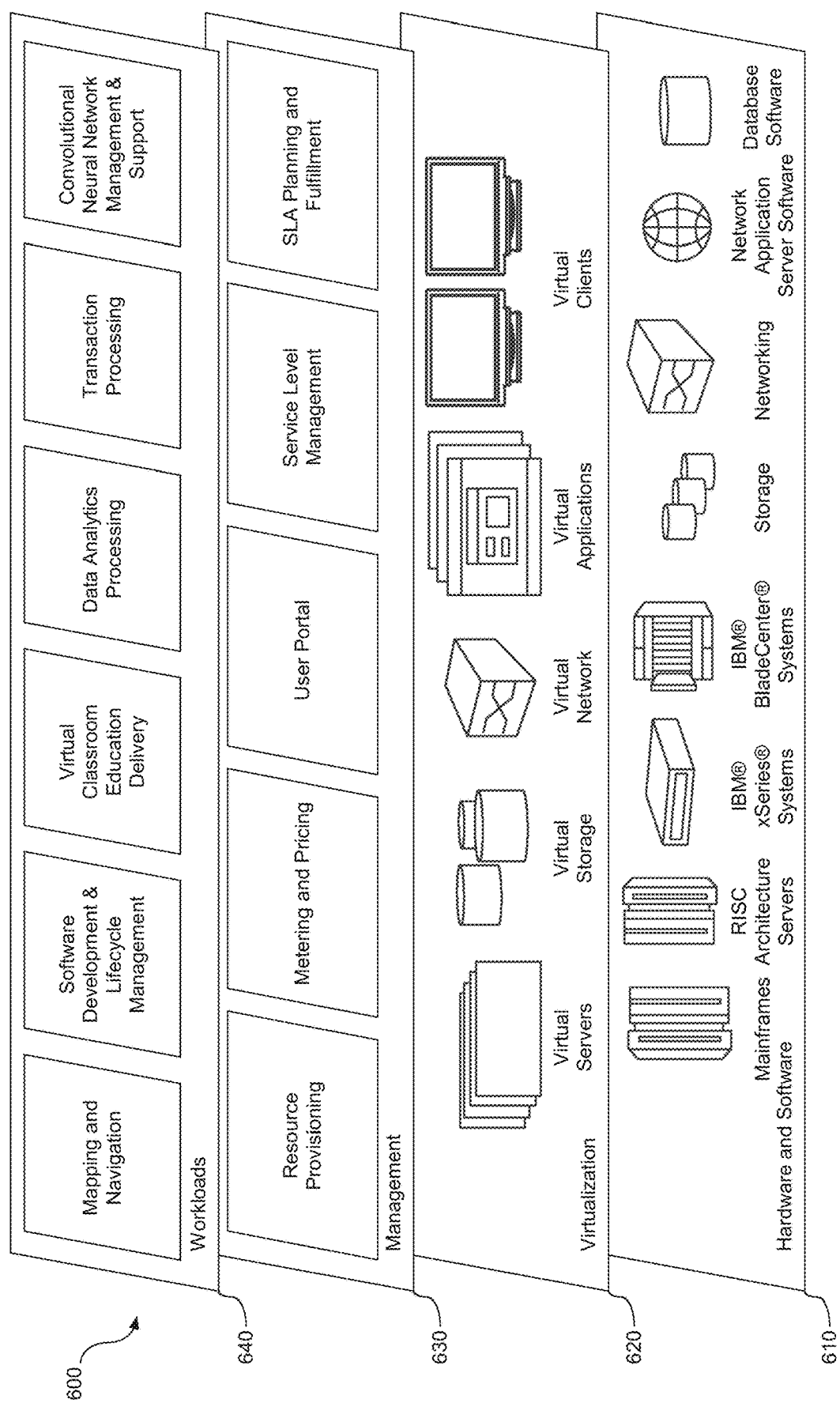
FIG. 6 depicts a block diagram illustrating a set of functional abstraction model layers provided by the cloud computing environment.

Referring now to FIG. 6, a set of functional abstraction layers (600) provided by the cloud computing network of FIG. 5 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640).

The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and convolutional neural network management and support.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to support a defensive optimization methodology to defend against adversarial attacks on the neural network with respect to misclassification and misinterpretation.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A system comprising:
a processor operatively coupled to memory;
an artificial intelligence (AI) platform, in communication with the processor, having one or more tools to support a convolutional neural network (CNN), the one or more tools comprising:
a map manager to localize a class-specific discriminative image region to interpret a prediction of a CNN, including the map manager to apply a class activation map (CAM) function to received input data;
an attack manager, operatively coupled to the map manager, the attack manager to:
generate a first attack on the CNN with respect to the received input data, the first attack to generate first perturbed data and a first CAM; and
generate a second attack on the CNN with respect to the received input data, the second attack to generate second perturbed data and a second CAM;
a measurement manager, operatively coupled to the attack manager, the measurement manager to measure an interpretability discrepancy, the measured interpretability discrepancy to quantify one or more differences between the first CAM and the second CAM;
an application manager, operatively coupled to the measurement manager, the application manager to apply the measured interpretability discrepancy to the CNN, the application being a response to any inconsistency between the first CAM and the second CAM;
a modified CNN generated as output from the AI platform, wherein the modified CNN includes one or more reinforcement protocols against an adversarial attack.

2. The system of claim 1, further comprising the measurement manager to:
design a regularization function to minimize inconsistency between the first CAM and the second CAM; and
re-train the CNN with the designed regularization function.

3. The system of claim 2, wherein the first attack is an attack against interpretability (AAI) and the second attack is an interpretability sneaking attack (ISA).

4. The system of claim 3, further comprising the measurement manager to quantify a relationship between robustness in classification and robustness in network interpretability.

5. The system of claim 4, further comprising the measurement manager to incorporate the quantified relationship into the network re-training, wherein the incorporation minimizes the interpretability discrepancy.

6. The system of claim 2, wherein the design of the regularization function includes the measurement manager to apply a softmax function to adjust importance of one or more non-true labels according to their classification confidence.

7. The system of claim 1, further comprising the measurement manager to evaluate the re-trained CNN against one or more baseline models to further mitigate adversarial attacks to the convolutional neural network.

8. A computer program product to support a convolutional neural network (CNN), the computer program product comprising a computer readable storage medium having program code embodied therewith, the program code executable by a processor to:
- localize a class-specific discriminative image region to interpret a prediction of a CNN, including apply a class activation map (CAM) function to received input data;
- generate a first attack on the CNN with respect to the received input data, the first attack to generate first perturbed data and a first CAM; and
- generate a second attack on the CNN with respect to the received input data, the second attack to generate second perturbed data and a second CAM;
- measure an interpretability discrepancy, the measured interpretability discrepancy to quantify one or more differences between the first CAM and the second CAM of perturbed data with respect to the input data;
- apply the measured interpretability discrepancy to the CNN, the application being a response to any inconsistency between the first CAM and the second CAM;
- a modified CNN generated as output from an AI platform, wherein the modified CNN includes one or more reinforcement protocols against an adversarial attack.

9. The computer program product of claim 8, further comprising program code to:
- design a regularization function to minimize inconsistency between the first CAM and the second CAM; and
- re-train the CNN with the designed regularization function.

10. The computer program product of claim 9, wherein the first attack is an attack against interpretability (AAI) and the second attack is an interpretability sneaking attack (ISA).

11. The computer program product of claim 10, further comprising program code to quantify a relationship between robustness in classification and robustness in network interpretability.

12. The computer program product of claim 11, further comprising the program code to incorporate the quantified relationship into the network re-training, wherein the incorporation minimizes the interpretability discrepancy.

13. The computer program product of claim 9, wherein the design of the regularization function includes the program code to apply a softmax function to adjust importance of one or more non-true labels according to their classification confidence.

14. A computer implemented method comprising:
- localizing a class-specific discriminative image region to interpret a prediction of a convolutional neural network (CNN), including applying a class activation map (CAM) function to received input data;
- generating a first attack on the CNN with respect to the received input data, and generating first perturbed data and a first CAM, and generating a second attack on the CNN with respect to the unperturbed input data, and generating second perturbed data and a second CAM;
- interpreting the first and second attacks as reflected in the first CAM produced from the first attack and the second CAM produced from the second attack;
- measuring an interpretability discrepancy, including quantifying one or more differences between the first CAM and the second CAM of perturbed data with respect to the unperturbed input data; and
- applying the measured interpretability discrepancy to the CNN, the application responding to any inconsistency between the first CAM and the second CAM, and strengthening the CNN against an adversarial attack.

15. The method of claim 14, wherein measuring an interpretability discrepancy further comprises:
- designing a regularization function to minimize inconsistency between the first CAM and the second CAM; and
- re-training the CNN with the designed regularization function.

16. The method of claim 15, wherein the first attack is an attack against interpretability (AAI) and the second attack is an interpretability sneaking attack (ISA).

17. The method of claim 16, wherein measuring an interpretability discrepancy includes quantifying a relationship between robustness in classification and robustness in network interpretability.

18. The method of claim 17, further comprising incorporating the quantified relationship into the network re-training, including minimizing the interpretability discrepancy.

19. The method of claim 15, wherein designing the regularization function includes applying a softmax function to adjust importance of one or more non-true labels according to their classification confidence.

20. The method of claim 14, further comprising evaluating the re-trained CNN against one or more baseline models to further mitigate adversarial attacks to the convolutional neural network.

* * * * *